(12) United States Patent
Zhang et al.

(10) Patent No.: US 9,611,683 B2
(45) Date of Patent: Apr. 4, 2017

(54) ELECTRONIC DEVICE AND CONNECTION APPARATUS

(71) Applicant: Lenovo (Beijing) Co., Ltd., Beijing (CN)

(72) Inventors: Ran Zhang, Beijing (CN); Wei Su, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 14 days.

(21) Appl. No.: 14/665,439

(22) Filed: Mar. 23, 2015

(65) Prior Publication Data

US 2016/0060931 A1   Mar. 3, 2016

(30) Foreign Application Priority Data

Sep. 3, 2014   (CN) .......................... 2014 1 0446190

(51) Int. Cl.
| | |
|---|---|
| *G06F 1/16* | (2006.01) |
| *E05D 11/08* | (2006.01) |
| *E05D 3/12* | (2006.01) |
| *E05F 5/02* | (2006.01) |

(52) U.S. Cl.
CPC .............. *E05D 11/082* (2013.01); *E05D 3/12* (2013.01); *E05D 3/122* (2013.01); *E05F 5/02* (2013.01); *G06F 1/1616* (2013.01); *G06F 1/1656* (2013.01); *G06F 1/1681* (2013.01); *E05D 2011/085* (2013.01); *E05Y 2900/606* (2013.01)

(58) Field of Classification Search
CPC ......... E05D 3/12; E05D 3/122; E05D 11/082; E05D 2011/085; E05D 3/06; E05D 7/00; E05F 5/02; G06F 1/1616; G06F 1/1681; G06F 1/1656; G06F 1/16; G06F 1/1618; G06F 1/1637; G06F 1/1643; Y10T 16/541; Y10T 16/547; E05Y 2201/71; H04M 1/022
USPC ............ 361/679.01, 679.02, 679.09, 679.26, 361/679.27
See application file for complete search history.

(56) References Cited

U.S. PATENT DOCUMENTS

| | | | |
|---|---|---|---|
| 9,021,657 B2 * | 5/2015 | Park ..................... | H05K 5/0226 16/354 |
| 9,115,750 B2 * | 8/2015 | Park ....................... | F16C 11/10 16/354 |

FOREIGN PATENT DOCUMENTS

| | | |
|---|---|---|
| DE | 202008016046 U1 | 2/2009 |
| WO | WO-2013138336 A1 | 9/2013 |

OTHER PUBLICATIONS

First German Office Action regarding Application No. 102015105011.0 dated Jul. 3, 2015. Partial English translation provided by Unitalen Attorneys at Law.

* cited by examiner

*Primary Examiner* — Anthony Haughton
*Assistant Examiner* — Ingrid Wright
(74) *Attorney, Agent, or Firm* — Harness, Dickey & Pierce, P.L.C.

(57) ABSTRACT

An electronic device and a connection apparatus are provided. The electronic device includes a first body, a second body and a connection apparatus rotatably connecting the first body to the second body. The connection apparatus includes a first damping member and a second damping member, which are operable to mutually cooperate with each other, wherein a contact force between the first damping member and the second damping member is variable to accordingly generate a variable damping force on the first (Continued)

body and the second body according to a relative arrangement between the first body and the second body.

20 Claims, 4 Drawing Sheets

ELECTRONIC DEVICE AND CONNECTION APPARATUS

This application claims the benefit of priority to Chinese Patent Application No. 201410446190.X titled "ELECTRONIC DEVICE AND CONNECTION APPARATUS", filed with the Chinese State Intellectual Property Office on Sep. 3, 2014, the entire disclosure of which is incorporated herein by reference.

TECHNICAL FIELD

The present application relates to an electronic device and a connection apparatus.

BACKGROUND

A drag rotation shaft is used for unfolding and folding an electronic device, however, the resistance provided by the drag rotation shaft is constant, that is, the resistance provided by the drag rotation shaft remains unchanged regardless of the unfolding angle of the electronic device. Although the resistance provided by the drag rotation shaft can hold the electronic device and allows the electronic device to be unfolded at any angle, a variable resistance is required to provide a hand feel for a user corresponding to various application circumstances. Further, different resistances can provide different supporting forces for the electronic device, which facilitates the user choosing a corresponding support force. Unfortunately, the conventional electronic device cannot provide a drag rotation shaft having a variable resistance.

SUMMARY

It is provided an electronic device. The electronic device includes a first body; a second body; and a connection apparatus rotatably connecting the first body to the second body, and the connection apparatus includes: a first damping member and a second damping member, which are operable to mutually cooperate, wherein a contact force between the first and second damping members is variable to accordingly generate a variable damping force on the first body and the second body according to a relative arrangement between the first body and the second body.

A connection apparatus includes a first damping member; and a second damping member, wherein the first damping member and the second damping member are operable to mutually cooperate, so that a contact force between the first damping member and the second damping member is variable to accordingly generate a variable damping force.

DETAILED DESCRIPTION

Figure 1:
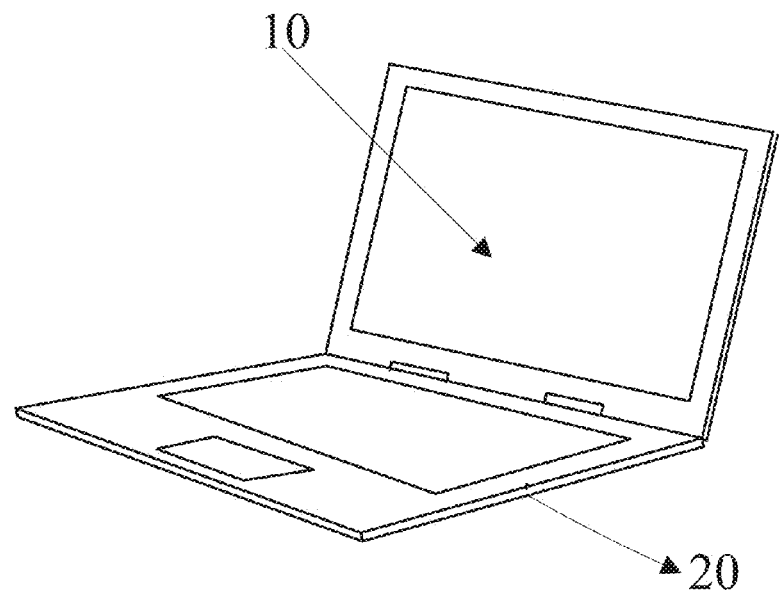
FIG. 1 is a schematic view showing the structure of an electronic device according to an embodiment of the present application.

For making the objects, technical solutions, and advantages of the present application more clear, the present application is further described in detail hereinafter in conjunction with embodiments and drawings.

An electronic device is provided according to an embodiment of the present application, which includes a first body; a second body; and a connection apparatus rotatably connecting the first body to the second body.

In the embodiment of the present application, the electronic device may be a laptop; in this case, the first body may be a cover having a display screen, and the second body may be a host having a key board. The first body and the second body are connected by the connection apparatus in the embodiment of the present application, thus the first body may be unfolded and folded with respect to the second body.

As an implementation, the electronic device may also be a tablet computer; in this case, the second body may be the tablet computer having a touch screen, and the first body may be a supporting member disposed on the tablet computer. Due to the support of the supporting member, the tablet computer can be supported on the supporting surface.

It can be appreciated by those skilled in the art that, the first body and the second body in the embodiment of the present application are general terms, and are not limited to a specific part of the electronic device.

The connection apparatus according to the embodiment of the present application includes a first damping device and a second damping device. The first damping member and the second damping member may mutually cooperate, and a contact force between the first damping member and the second damping member is variable to accordingly generate a variable damping force on the first body and the second body according to a relative arrangement between the first body and the second body.

In the embodiment of the present application, the damping devices are provided for increasing the resistance of the connection apparatus in the relative rotation between the first body and the second body. Further, when the first body is rotated with respect to the second body to a predetermined angle threshold, the connection apparatus provides the maximum resistance.

The connection apparatus according to the embodiment of the present application further includes a first connection member, a first rotation shaft coupled to the first connection member, the first damping device being coupled to the first rotation shaft, a first transmission member coupled to the first rotation shaft, a second connection member, a second rotation shaft coupled to the second connection member, the second damping device being coupled to the second rotation shaft, and a second transmission member coupled to the second rotation shaft and configured to cooperate with the first transmission member to effect a relative rotation between the first connection member and the second connection member.

The first connection member is coupled to the first body. In the embodiment of the present application, the first connection member is a connection member fixedly connected to the body of the electronic device, and the first connection member is connected to a rotation shaft of the connection apparatus, and is rotatable along with the rotation of the rotation shaft.

The second connection member is coupled to the second body. In the embodiment of the present application, the second connection member is a connection member fixedly connected to the body of the electronic device, and the second connection member is connected to the rotation shaft of the connection apparatus, and is rotatable along with the rotation of the rotation shaft.

The connection apparatus further includes a first set of rotation shaft coupled to the first connection member, and a second set of rotation shaft coupled to the second connection member. The first set of rotation shaft includes at least the first rotation shaft, the second set of rotation shaft includes at least the second rotation shaft. The first transmission member is arranged on one end of the first rotation shaft, which abuts against the second rotation shaft.

The first damping device is operable to abut against the second damping device to generate a first contact force to accordingly generate a first damping force on the first body and the second body if the first body is arranged with respect to the second body at a first angle; to abut against the second damping device to generate a second contact force to accordingly generate a second damping force on the first body and the second body if the first body is arranged with respect to the second body at a second angle; and to abut against the second damping device to generate a third contact force to accordingly generate a third damping force on the first body and the second body if the first body is arranged with respect to the second body at a third angle, wherein the first damping force is smaller than the second damping force but greater than the third damping force.

In the embodiment of the present application, when the first body is rotated with respect to the second body, a distance between the centre of a cam structure of the first damping device and the centre of a cam structure of the second damping device is variable.

In the embodiment of the present application, the electronic device further includes an elastic cover, which wholly covers the first body, the connection apparatus and the second body. The elastic cover includes a window which shows a portion of the first body, or a portion of the second body.

It can be appreciated by those skilled in the art, all the electronic devices that are foldable may employ the connection apparatus in the embodiment of the present application.

An electronic device is further provided according to an embodiment of the present application, which includes a first body; a second body; and a connection apparatus.

In the embodiment of the present application, the electronic device may be a laptop; in this case, the first body may be a cover having a display screen, and the second body may be a host having a key board. The first body and the second body are connected by the connection apparatus in the embodiment of the present application, thus the first body may be unfolded and folded with respect to the second body.

As an implementation, the electronic device may also be a tablet computer; in this case, the second body may be the tablet computer having a touch screen, and the first body may be a supporting member disposed on the tablet computer. Due to the support of the supporting member, the tablet computer can be supported on the supporting surface.

It can be appreciated by those skilled in the art that, the first body and the second body in the embodiment of the present application are general terms, and are not limited to a specific part of the electronic device.

The first body is rotatably connected to the second body via the connection apparatus. Under the action of an external force, the first body can be rotated about an axis with respect to the second body in a predetermined range through the connection apparatus, and the axis is located between the first body and the second body. When the external force is removed, the connection apparatus maintains a relative rotational angle between the first body and the second body.

In the embodiment of the present application, the predetermined range refers to 360 degree. That is, the first body of the electronic device may be rotated with respect to the second body by 360 degree through the connection apparatus, and the first body and the second body can be changed from a face to face contact to a back to back contact.

The connection apparatus according to the embodiment of the present application includes a first connection member, a first set of rotation shaft, a second connection member, a second set of rotation shaft, a first damping device and a second damping device.

The first connection member is connected to the first body. In the embodiment of the present application, the first connection member is a connection member fixedly connected to the body of the electronic device, and the first connection member is connected to a rotation shaft of the connection apparatus, and is rotatable along with the rotation of the rotation shaft.

The first set of rotation shaft is fixedly connected to the first connection member. The first set of rotation shaft includes at least one first rotation shaft, and at least one end of the first rotation shaft, which abuts against the second set of rotation shaft, in the at least one first rotation shaft is provided with a first transmission member.

In the embodiment of the present application, the first set of rotation shaft may include one or more rotation shafts, and a transmission member is provided on the rotation shaft. Generally, two ends of the rotation shaft are both provided with the transmission member. If only one end of the rotation shaft is provided with the transmission member, the technical solution of the embodiment of the present application can also be achieved. The transmission member may be a gear, a ratchet or other structures. When the first set of rotation shaft includes two or more rotation shafts, two ends of each of the rotation shafts are both provided with the transmission member, and the adjacent rotation shafts are connected through the cooperation between the transmission members. That is, the transmission member on each of the rotation shafts engage with the transmission member on the adjacent rotation shaft, thus once one of the rotation shafts rotates, other rotation shafts are rotated by the rotating rotation shaft.

As an implementation, when the first set of rotation shaft includes two or more rotation shafts, the two or more rotation shafts can only have one transmission shaft, that is, each of the rotation shafts act as a rotation shaft of the transmission member. When the transmission member rotates, the two or more rotation shafts are rotated simultaneously.

The second connection member is connected to the second body. In the embodiment of the present application, the second connection member is a connection member fixedly connected to the body of the electronic device, and the second connection member is connected to the rotation shaft of the connection apparatus, and is rotatable along with the rotation of the rotation shaft.

The second set of rotation shaft is fixedly connected to the second connection member. The second set of rotation shaft includes at least one second rotation shaft, and at least one end of the second rotation shaft, which abuts against the first set of rotation shaft, in the at least one second rotation shaft is provided with a second transmission member.

In the embodiment of the present application, the second set of rotation shaft may include one or more rotation shafts, and a transmission member is provided on the rotation shaft. Generally, two ends of the rotation shaft are both provided with the transmission member. If only one end of the rotation shaft is provided with the transmission member, the technical solution of the embodiment of the present application can also be achieved. The transmission member may be a gear, a ratchet or other structures. When the second set of rotation shaft includes two or more rotation shafts, two ends of each of the rotation shafts are both provided with the transmission member, and the adjacent rotation shafts are connected through the cooperation between the transmission members. That is, the transmission member on each of the rotation shafts engage with the transmission member on the adjacent rotation shaft, thus once one of the rotation shafts rotates, other rotation shafts are rotated by the rotating rotation shaft.

As an implementation, when the second set of rotation shaft includes two or more rotation shafts, the two or more rotation shafts can only have one transmission shaft, that is, each of the rotation shafts act as a rotation shaft of the transmission member. When the transmission member rotates, the two or more rotation shafts are rotated simultaneously.

The first damping device is arranged on the at least one first rotation shaft in the first set of rotation shaft.

The second damping device is arranged on the at least one second rotation shaft in the second set of rotation shaft, and the position of the second damping device is corresponding to the position of the first damping device.

In the embodiment of the present application, the damping devices are provided for increasing the resistance of the connection apparatus in the relative rotation between the first body and the second body. Further, when the first body is rotated with respect to the second body to a predetermined angle threshold, the connection apparatus provides the maximum resistance.

In the process of the first body rotating with respect to the second body in a first direction through the first set of rotation shaft and the second set of rotation shaft, the first damping device abuts against the second damping device to generate a first strength of the adjustable damping force when the first body is rotated with respect to the second body to a first angle; the damping force generated between the first damping device and the second damping device is gradually increased to a second strength of the adjustable damping force when the first body is rotated with respect to the second body to the second angle from the first angle; the damping force generated between the first damping device and the second damping device is gradually decreased to a third strength of the adjustable damping force when the first body is rotated with respect to the second body to a third angle from the second angle; and the first damping device is disengaged from the second damping device when the first body is rotated with respect to the second body to an angle greater than the third angle.

In the process of the first body rotating with respect to the second body in a second direction through the first set of rotation shaft and the second set of rotation shaft, the first damping device abuts against the second damping device to generate the third strength of the adjustable damping force when the first body is rotated with respect to the second body to the third angle; the damping force generated between the first damping device and the second damping device is gradually increased to the second strength of the adjustable damping force when the first body is rotated with respect to the second body to the second angle from the third angle; the damping force generated between the first damping device and the second damping device is gradually decreased to the first strength of the adjustable damping force when the first body is rotated with respect to the second body to the first angle from the second angle; and the first damping device is disengaged from the second damping device when the first body is rotated with respect to the second body to an angle smaller than the first angle. The first direction is opposite to the second direction.

It can be appreciated by those skilled in the art, all the electronic devices that are foldable may employ the connection apparatus in the embodiment of the present application.

In the embodiment of the present application, when the first body is rotated with respect to the second body from the third angle to the second angle, a distance between the centre of a cam structure of the first damping device and the centre of a cam structure of the second damping device has a maximum value.

In the embodiment of the present application, each of the first damping device and the second damping device preferably is a cam structure. Since the cam has a non-circular shape, the second angle can be controlled by defining the shape or the size of the cam and adjusting an abutting angle of two cams, thus, when the first body is rotated with respect to the second body to the second angle, the distance between the two rotation shafts of the two cams is maximum, and at this time, the two abutting cams generates the maximum resistance and provide the maximum supporting force for the first body and the second body at the same time. Once the first body is rotated with respect to the second body to an angle greater than or smaller than the second angle, the resistance generated by the two abutting cams is decreased.

In the embodiment of the present application, each of the at least one first rotation shaft in the first set of rotation shaft and the at least one second rotation shaft in the second set of rotation shaft is an elastic member.

In the embodiment of the present application, the electronic device further includes an elastic cover, which wholly covers the first body, the connection apparatus and the second body to allow the electronic device to present an integral and uniform appearance.

As the first body is folded and unfolded, under the action of an external force, with respect to the second body in the predetermined range through the connection apparatus, the elastic cover is elastically deformed to keep the integral and uniform appearance of the electronic device.

In the embodiment of the present application, the electronic device can provide a better appearance experience for users by providing a corresponding cover for the first body, the connection apparatus and the second body. The cover makes the electronic device more artistic.

In the embodiment of the present application, the elastic cover includes a first window for showing an operation surface or a display surface of a first electronic element of the first body, and/or a second window for showing an operation surface or a display surface of a second electronic element of the second body.

In the embodiment of the present application, for allowing the user to use the display screen and the key board of the electronic device conveniently, a window is provided on the elastic cover at the area where the display screen and the key board are located, thus the display screen and the key board are exposed, thereby facilitating operating and controlling the electronic device. In the embodiment of the present application, the display screen and the key board are not limited to be located on a specific body.

In the embodiment of the present application, the connection apparatus is arranged between the first body and the second body, and the length of a first edge of the connection apparatus is equal to the length of a first edge of the first body, and the first edge of the connection apparatus is in parallel with the axis, and the first edge of the first body is in parallel with the axis; and/or, the length of a second edge of the connection apparatus is equal to the length of a first edge of the second body; the second edge of the connection apparatus is in parallel with the axis, and the first edge of the second body is in parallel with the axis.

That is, the connection apparatus is wholly arranged between the first body and the second body. The length of the connection apparatus is equal to the length of the first body and the length of the second body.

In the embodiment of the present application, a main function module is formed by the first connection member, the first set of rotation shaft, the second connection member, the second set of rotation shaft, the first damping device and the second damping device. The connection apparatus includes at least one main function module.

In the embodiment of the present application, the connection apparatus, as a whole, includes the first connection member, the first set of rotation shaft, the second connection member, the second set of rotation shaft, the first damping device, and the second damping device. The electronic device may have one or more connection apparatuses.

In the embodiment of the present application, the connection apparatus further includes at least one auxiliary unit. Each of the at least one auxiliary unit is arranged between two adjacent main function modules.

That is, the auxiliary unit is arranged between each two adjacent connection apparatuses. The auxiliary unit may only be provided for increasing the distance between the connection apparatuses, and it may be a connection sheet or a connection block, which is used to connect multiple connection apparatuses in series.

A connection apparatus is further provided according to an embodiment of the present application. The connection apparatus can be applied in the above electronic device, and the connection apparatus includes a first damping member; and a second damping member, and the first damping member and the second damping member are operable to mutually cooperate, so that a contact force between the first damping member and the second damping member is variable to accordingly generate a variable damping force.

The connection apparatus further includes a first connection member; a first rotation shaft coupled to the first connection member; a first transmission member coupled to the first rotation shaft; a second connection member; a second rotation shaft coupled to the second connection member, and a second transmission member coupled to the second rotation shaft. The first damping device is coupled to the first rotation shaft, and the second damping device is coupled to the second rotation shaft.

The connection apparatus further includes a first set of rotation shaft coupled to the first connection member, and a second set of rotation shaft coupled to the second connection member. The first set of rotation shaft includes at least the first rotation shaft, the second set of rotation shaft includes at least the second rotation shaft. The first transmission member is arranged on one end of the first rotation shaft, which abuts against the second rotation shaft.

The first damping device is operable to abut against the second damping device to generate a first contact force to accordingly generate a first damping force on the first body and the second body if the first body is arranged with respect to the second body at a first angle; to abut against the second damping device to generate a second contact force to accordingly generate a second damping force on the first body and the second body if the first body is arranged with respect to the second body at a second angle; and to abut against the second damping device to generate a third contact force to accordingly generate a third damping force on the first body and the second body if the first body is arranged with respect to the second body at a third angle, wherein the first damping force is smaller than the second damping force but greater than the third damping force.

A connection apparatus is further provided according to an embodiment of the present application. The connection apparatus can be applied in the above electronic device, and the connection apparatus includes: a first connection member; a first set of rotation shaft fixedly connected to the first connection member; the first set of rotation shaft includes: at least one first rotation shaft, and at least one end of the first rotation shaft, which abuts against a second set of rotation shaft, in the at least one first rotation shaft is provided with a first transmission member; a second connection member; the second set of rotation shaft fixedly connected to the second connection member; the second set of rotation shaft includes: at least one second rotation shaft, and at least one end of the second rotation shaft, which abuts against the first set of rotation shaft, in the at least one second rotation shaft is provided with a second transmission member; a first damping device arranged on the at least one first rotation shaft in the first set of rotation shaft; a second damping device arranged on the at least one second rotation shaft in the second set of rotation shaft, and the position of the second damping device is corresponding to the position of the first damping device; in the process of the first connection member rotating with respect to the second connection member in a first direction through the first set of rotation shaft and the second set of rotation shaft, the first damping device abuts against the second damping device to generate a first strength of the adjustable damping force when the first connection member is rotated with respect to the second connection member to a first angle; the damping force generated between the first damping device and the second damping device is gradually increased to a second strength of the adjustable damping force when the first connection member is rotated with respect to the second connection member to the second angle from the first angle; the damping force generated between the first damping device and the second damping device is gradually decreased to a third strength of the adjustable damping force when the first connection member is rotated with respect to the second connection member to a third angle from the second angle; and the first damping device is disengaged from the second damping device when the first connection member is rotated with respect to the second connection member to an angle greater than the third angle; and in the process of the first connection member rotating with respect to the second connection member in a second direction through the first set of rotation shaft and the second set of rotation shaft, the first damping device abuts against the second damping device to generate the third strength of the adjustable damping force when the first connection member is rotated with respect to the second connection member to the third angle; the damping force generated between the first damping device and the second damping device is gradually increased to the second strength of the adjustable damping force when the first connection member is rotated with respect to the second connection member to the second angle from the third angle; the damping force generated between the first damping device and the second damping device is gradually decreased to the first strength of the adjustable damping force when the first connection member is rotated with respect to the second connection member to the first angle from the second angle; and the first damping device is disengaged from the second damping device when the first connection member is rotated with respect to the second connection member to an angle smaller than the first angle. The first direction is opposite to the second direction.

Each of the first damping device and the second damping device is a cam structure.

When the first connection member is rotated with respect to the second connection member from the third angle to the second angle, a distance between the centre of a cam structure of the first damping device and the centre of a cam structure of the second damping device has a maximum value.

Each of the at least one first rotation shaft in the first set of rotation shaft and the at least one second rotation shaft in the second set of rotation shaft is an elastic member.

The specific structure of the connection apparatus in the embodiment of the present application can be referred to the relevant description of the above electronic device, which will not be described in detail herein.

The technical solution of the present application is further illustrated by way of specific embodiments hereinafter.

FIG. 1 is a schematic view showing the structure of an electronic device according to a first embodiment of the present application. As shown in FIG. 1, the electronic device in the embodiment of the present application includes: a first body 10; a second body 20; and a connection apparatus 30.

In the embodiment of the present application, the electronic device may be a laptop; in this case, the first body 10 may be a cover having a display screen, and the second body 20 may be a host having a key board. The first body 10 and the second body 20 are connected by the connection apparatus 30 in the embodiment of the present application, thus the first body 10 may be unfolded and folded with respect to the second body 20.

It can be appreciated by those skilled in the art that, the first body 10 and the second body 20 in the embodiment of the present application are general terms, and are not limited to a specific part of the electronic device.

The first body 10 is rotatably connected to the second body 20 via the connection apparatus 30. Under the action of an external force, the first body 10 can be rotated about an axis with respect to the second body 20 in a predetermined range through the connection apparatus 30, and the axis is located between the first body 10 and the second body 20. When the external force is removed, the connection apparatus 30 can maintain the relative rotation angle between the first body 10 and the second body 20.

Figure 2:
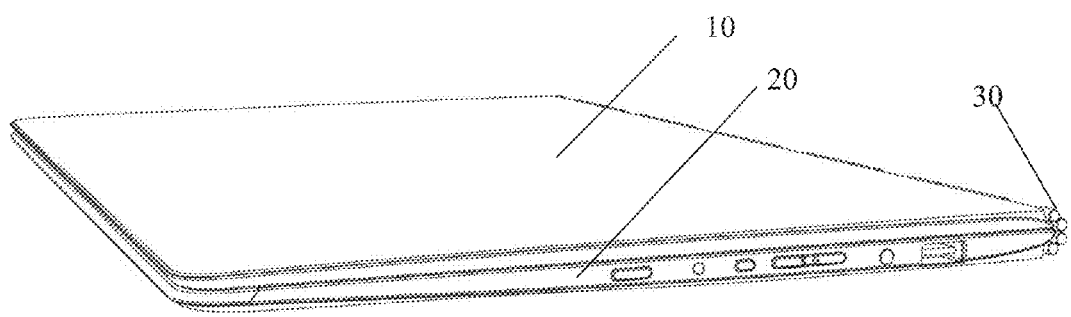
FIG. 2 is a schematic view of the electronic device in a folding state according to the embodiment of the present application.

In the embodiment of the present application, the predetermined range may be 360 degree. As shown in FIG. 2, the first body 10 of the electronic device in this embodiment may be rotated with respect to the second body 20 by 360 degree through the connection apparatus 30, and the first body 10 can be rotated with respect to the second body 20 from 0 degree to 360 degrees, that is the first body 10 and the second body 20 can be changed from a face to face contact to a back to back contact.

The connection apparatus 30 according to the embodiment of the present application includes a first connection member 301, a first set of rotation shaft 302, a second connection member 303, a second set of rotation shaft 304, a first damping device 305 and a second damping device 306.

The first connection member 301 is connected to the first body 10. In the embodiment of the present application, the first connection member 301 is a connection member fixedly connected to the body of the electronic device, and the first connection member 301 is connected to a rotation shaft of the connection apparatus 30, and is rotatable along with the rotation of the rotation shaft.

The first set of rotation shaft 302 is fixedly connected to the first connection member 301. The first set of rotation shaft 302 includes at least one first rotation shaft 3021, and at least one end of the first rotation shaft 3021, which abuts against the second set of rotation shaft 303, in the at least one first rotation shaft 3021 is provided with a first transmission member 3022.

In the embodiment of the present application, the first set of rotation shaft 302 may include one or more first rotation shafts 3021, and a transmission member 3022 is provided on the rotation shaft. Generally, two ends of the rotation shaft are both provided with the transmission member. If only one end of the rotation shaft is provided with the transmission member 3022, the technical solution of the embodiment of the present application can also be achieved. The transmission member 3022 may be a gear, a ratchet or other structures. When the first set of rotation shaft 302 includes two or more first rotation shafts 3021, two ends of each of the first rotation shafts 3021 are both provided with the transmission member 3022, and the adjacent rotation shafts are connected through the cooperation between the transmission members. That is, the transmission member on each of the rotation shafts engage with the transmission member on the adjacent rotation shaft, thus once one of the rotation shafts rotates, other rotation shafts are rotated by the rotating rotation shaft.

As an implementation, when the first set of rotation shaft 302 includes two or more first rotation shafts 3021, the two or more first rotation shafts 3021 can only have one transmission shaft 3022, that is, each of the first rotation shafts act as a rotation shaft of the transmission member 3022. When the transmission member 3022 rotates, the two or more first rotation shafts are rotated simultaneously.

The second connection member 303 is connected to the second body 20. In the embodiment of the present application, the second connection member 303 is a connection member fixedly connected to the body of the electronic device, and the second connection member 303 is connected to the rotation shaft of the connection apparatus 30, and is rotatable along with the rotation of the rotation shaft.

The second set of rotation shaft 304 is fixedly connected to the second connection member 303. The second set of rotation shaft 304 includes at least one second rotation shaft 3041, and at least one end of the second rotation shaft 3041, which abuts against the first set of rotation shaft 302, in the at least one second rotation shaft 3041 is provided with a second transmission member 3042.

In the embodiment of the present application, the second set of rotation shaft 304 may include one or more second rotation shafts 3041, and a transmission member 3042 is provided on the second rotation shaft 3041. Generally, two ends of the rotation shaft are both provided with the transmission member 304. If only one end of the second rotation shaft 3041 is provided with the transmission member 3042, the technical solution of the embodiment of the present application can also be achieved. The transmission member 3042 may be a gear, a ratchet or other structures. When the second set of rotation shaft 304 includes two or more second rotation shafts 3041, two ends of each of the second rotation shafts 3041 are both provided with the transmission member 3042, and the adjacent second rotation shafts 3041 are connected through the cooperation between the transmission members. That is, the transmission member on each of the second rotation shafts 3041 engage with the transmission member on the adjacent second rotation shaft 3041, thus once one of the second rotation shafts 3041 rotates, other second rotation shafts 3041 are rotated by the rotating second rotation shaft 3041.

As an implementation, when the second set of rotation shaft 304 includes two or more second rotation shafts 3041, the two or more second rotation shafts 3041 can only have one transmission shaft 3042, that is, each of the second rotation shafts 3041 act as a rotation shaft of the transmission member 3042. When the transmission member 3042 rotates, the two or more second rotation shafts 3041 are rotated simultaneously.

The first damping device 305 is arranged on the at least one first rotation shaft 3021 in the first set of rotation shaft 302.

The second damping device 306 is arranged on the at least one second rotation shaft 3041 in the second set of rotation shaft 304, and the position of the second damping device 306 is corresponding to the position of the first damping device 305.

In the embodiment of the present application, the damping devices are provided for increasing the resistance of the connection apparatus 30 in the relative rotation between the first body 10 and the second body 30. Further, when the first body 10 is rotated with respect to the second body 20 to a predetermined angle threshold, the connection apparatus 30 provides the maximum resistance.

In the process of the first body 10 rotating with respect to the second body 20 in a first direction through the first set of rotation shaft 302 and the second set of rotation shaft 304, the first damping device 305 abuts against the second damping device 306 to generate a first strength of the adjustable damping force when the first body 10 is rotated with respect to the second body 20 to a first angle; the damping force generated between the first damping device 305 and the second damping device 306 is gradually increased to a second strength of the adjustable damping force when the first body 10 is rotated with respect to the second body 20 to the second angle from the first angle; the damping force generated between the first damping device 305 and the second damping device 306 is gradually decreased to a third strength of the adjustable damping force when the first body 10 is rotated with respect to the second body 20 to a third angle from the second angle; and the first damping device 305 is disengaged from the second damping device 306 when the first body 10 is rotated with respect to the second body 20 to an angle greater than the third angle.

In the process of the first body 10 rotating with respect to the second body 20 in a second direction through the first set of rotation shaft 302 and the second set of rotation shaft 304, the first damping device 305 abuts against the second damping device 306 to generate the third strength of the adjustable damping force when the first body 10 is rotated with respect to the second body 20 to the third angle; the damping force generated between the first damping device 305 and the second damping device 306 is gradually increased to the second strength of the adjustable damping force when the first body 10 is rotated with respect to the second body 20 to the second angle from the third angle; the damping force generated between the first damping device 305 and the second damping device 306 is gradually decreased to the first strength of the adjustable damping force when the first body 10 is rotated with respect to the second body 20 to the first angle from the second angle; and the first damping device 305 is disengaged from the second damping device 306 when the first body 10 is rotated with respect to the second body 20 to an angle smaller than the first angle. The first direction is opposite to the second direction.

In the embodiment of the present application, when the first body 10 is rotated with respect to the second body 20 from the third angle to the second angle, a distance between the centre of a cam structure of the first damping device 305 and the centre of a cam structure of the second damping device 306 has a maximum value.

Figure 4:
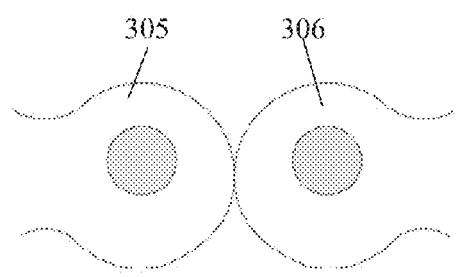
FIG. 4 is a schematic view of two damping devices in a cooperation state according to the embodiment of the present application.
Figure 5:
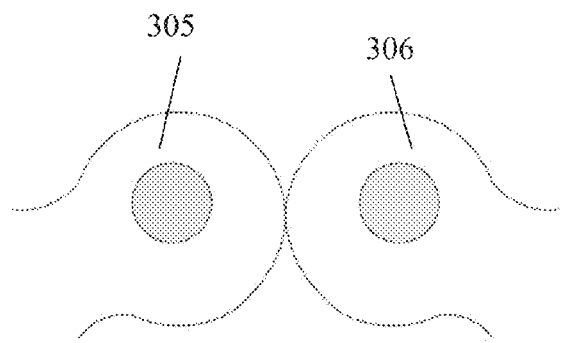
FIG. 5 is a schematic view of the two damping devices in another cooperation state according to the embodiment of the present application.
Figure 6:
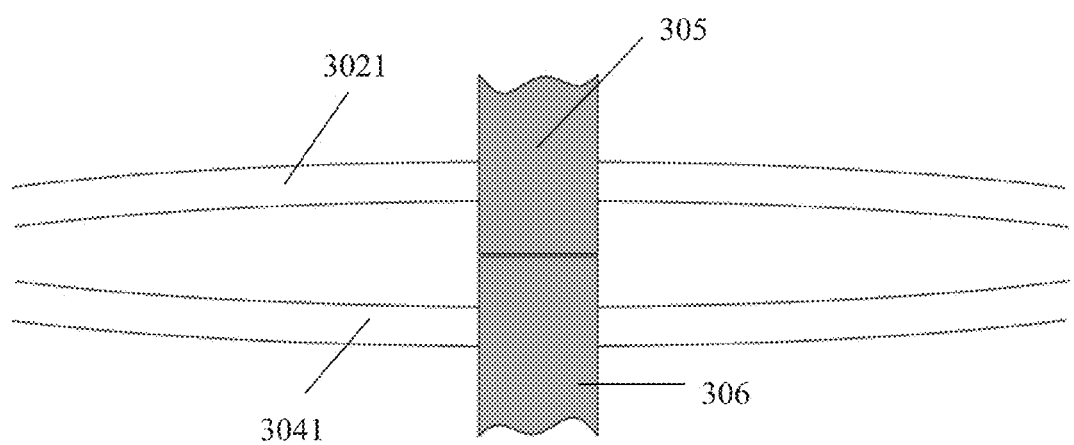
FIG. 6 is a schematic view showing the stress states of a first rotation shaft and a second rotation shaft when the damping devices abut against each other according to the embodiment of the present application.

In the embodiment of the present application, as shown in FIG. 4, each of the first damping device 305 and the second damping device 306 preferably is a cam structure. Since the cam has a non-circular shape, the second angle can be controlled by defining the shape or the size of the cam and adjusting an abutting angle of two cams. As shown in FIG. 5, when the first body 10 is rotated with respect to the second body 20 to the second angle, the distance between the two rotation shafts of the two cams is maximum, and at this time, the two abutting cams generates the maximum resistance. As shown in FIG. 6, since the distance between the two rotation shafts of the two cams is maximum, the first rotation shaft and the second rotation shaft respectively connected to the two cams are disengaged from each other. Thus, in the embodiment of the present application, the first rotation shaft and the second rotation shaft are preferably made of an elastic material. When the first body and the second body are held by the two cams at the second angle, the connection apparatus 30 provides the maximum supporting force for the first body 10 and the second body 20. Once the first body 10 is rotated with respect to the second body 20 to an angle greater than or smaller than the second angle, the damping force generated by the two abutting cams is decreased.

In the embodiment of the present application, each of the at least one first rotation shaft 3021 in the first set of rotation shaft 302 and the at least one second rotation shaft 3041 in the second set of rotation shaft 304 is an elastic member.

In the embodiment of the present application, the electronic device further includes an elastic cover, which wholly covers the first body 10, the connection apparatus 30 and the second body 20 to allow the electronic device to present an integral and uniform appearance.

As the first body 10 is folded and unfolded, under the action of an external force, with respect to the second body 20 in the predetermined range through the connection apparatus 30, the elastic cover is elastically deformed to keep the integral and uniform appearance of the electronic device.

In the embodiment of the present application, the electronic device can provide a better appearance experience for users by providing a corresponding cover for the first body 10, the connection apparatus 30 and the second body 20. The cover makes the electronic device more artistic.

In the embodiment of the present application, the elastic cover includes a first window for showing an operation surface or a display surface of a first electronic element of the first body 10, and/or a second window for showing an operation surface or a display surface of a second electronic element of the second body 20.

In the embodiment of the present application, for allowing the user to use the display screen and the key board of the electronic device conveniently, a window is provided on the elastic cover at the area where the display screen and the key board are located, thus the display screen and the key board are exposed, thereby facilitating operating and controlling the electronic device. In the embodiment of the present application, the display screen and the key board are not limited to be located on a specific body.

In the embodiment of the present application, the connection apparatus 30 is arranged between the first body 10 and the second body 20, and the length of a first edge of the connection apparatus 30 is equal to the length of a first edge of the first body 10, and the first edge of the connection apparatus 30 is in parallel with the axis, and the first edge of the first body 10 is in parallel with the axis; and/or, the length of a second edge of the connection apparatus 30 is equal to the length of a first edge of the second body 20; the second edge of the connection apparatus 30 is in parallel with the axis, and the first edge of the second body 20 is in parallel with the axis.

That is, the connection apparatus 30 is wholly arranged between the first body 10 and the second body 20. The length of the connection apparatus 30 is equal to the length of the first body 10 and the length of the second body 20.

Figure 3:
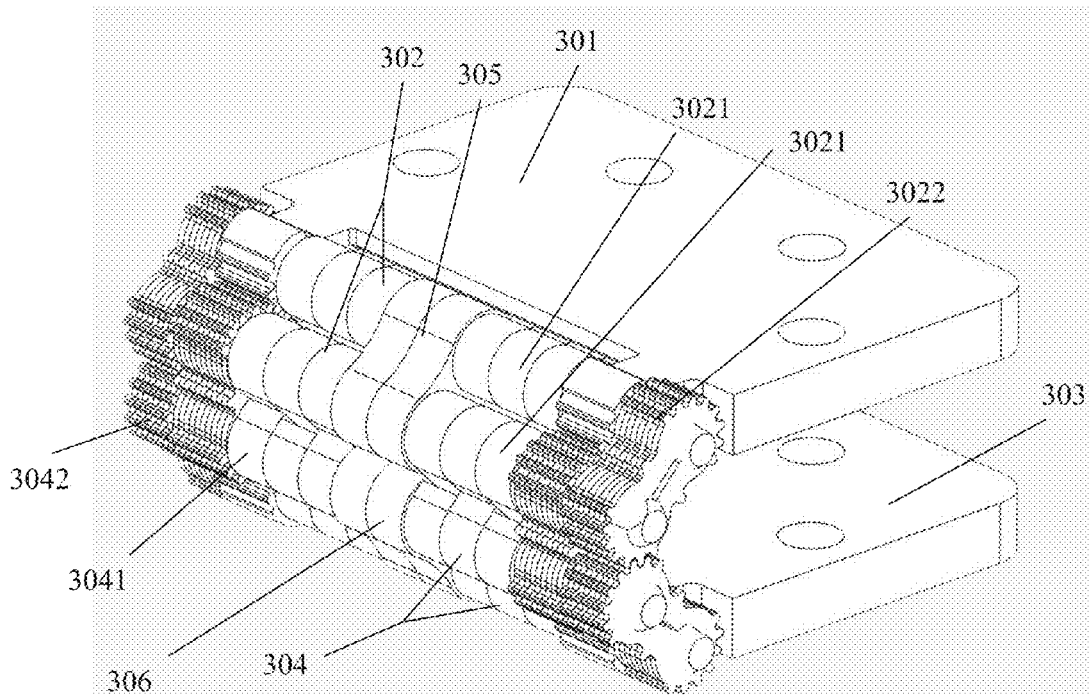
FIG. 3 is a schematic view showing the structure of a connection apparatus according to the embodiment of the present application.

In the embodiment of the present application, a main function module is formed by the first connection member 301, the first set of rotation shaft 302, the second connection member 303, the second set of rotation shaft 304, the first damping device 305 and the second damping device 306, that is, the structure shown in FIG. 3 forms a main function module. The connection apparatus 30 includes at least one main function module.

In the embodiment of the present application, the connection apparatus 30, as a whole, includes the first connection member 301, the first set of rotation shaft 302, the second connection member 303, the second set of rotation shaft 304, the first damping device 305, and the second damping device 306. The electronic device may have one or more connection apparatuses 30.

In the embodiment of the present application, the connection apparatus 30 further includes at least one auxiliary unit. Each of the at least one auxiliary unit is arranged between two adjacent main function modules.

That is, the auxiliary unit is arranged between each two adjacent connection apparatuses 30. The auxiliary unit may only be provided for increasing the distance between the connection apparatuses 30, and it may be a connection sheet or a connection block, which is used to connect multiple connection apparatuses 30 in series.

Figure 7:
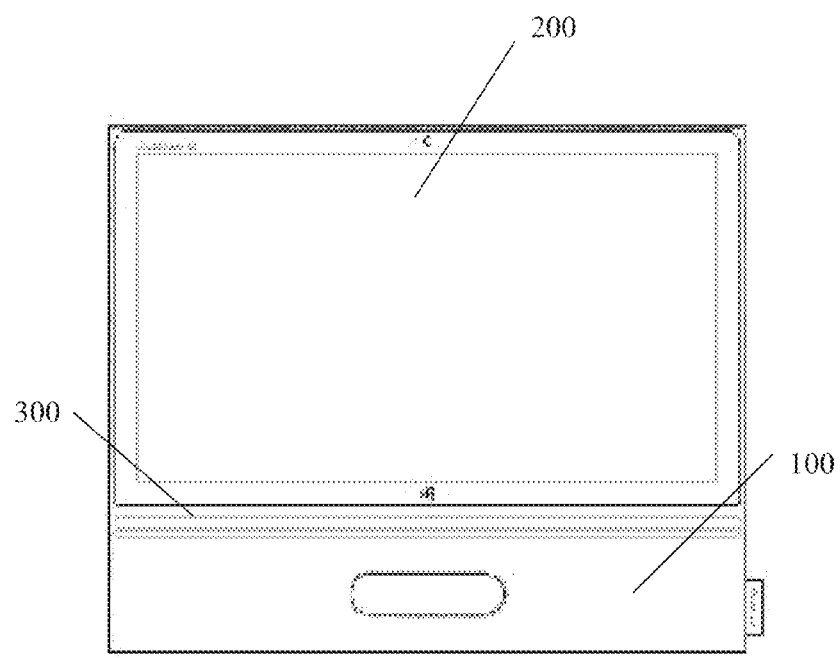
FIG. 7 is a schematic view showing the structure of another electronic device according to the embodiment of the present application.

FIG. 7 is a schematic view showing the structure of another electronic device according to an embodiment of the present application. As shown in FIG. 7, the electronic device in the embodiment is a tablet computer. The electronic device includes a first body 100 and a second body 200, and the first body 100 is connected to the second body 200 through a connection apparatus 300. The second body 200 may be the tablet computer having a touch screen, and the first body 100 may be a supporting member disposed on the tablet computer. Due to the support of the supporting member, the tablet computer can be supported on the supporting surface. In this embodiment, the specific structure of the connection apparatus 300 is completely identical with the structure of the above connection apparatus 30, thus will not be described in detail herein. The manner of connecting the first body 100 with the second body 200 through the connection apparatus 300 is completely identical with the manner of connecting the first body 10 with the second body 20 through the connection apparatus 30.

It can be appreciated by those skilled in the art that, all the electronic devices which are foldable may employ the connection apparatus in this embodiment of the present application.

A connection apparatus is further provided according to an embodiment of the present application, and the structure of the connection apparatus is shown in FIG. 3. The connection apparatus can be applied in the above electronic device, and the connection apparatus 30 includes a first connection member 301, a first set of rotation shaft 302, a second connection member 303, a second set of rotation shaft 304, a first damping device 305 and a second damping device 306.

The first connection member 301 is connected to the first body 10. In the embodiment of the present application, the first connection member 301 is a connection member fixedly connected to the body of the electronic device, and the first connection member 301 is connected to a rotation shaft of the connection apparatus 30, and is rotatable along with the rotation of the rotation shaft.

The first set of rotation shaft 302 is fixedly connected to the first connection member 301. The first set of rotation shaft 302 includes at least one first rotation shaft 3021, and at least one end of the first rotation shaft 3021, which abuts against the second set of rotation shaft 303, in the at least one first rotation shaft 3021 is provided with a first transmission member 3022.

In the embodiment of the present application, the first set of rotation shaft 302 may include one or more first rotation shafts 3021, and a transmission member 3022 is provided on the rotation shaft. Generally, two ends of the rotation shaft are both provided with the transmission member. If only one end of the rotation shaft is provided with the transmission member 3022, the technical solution of the embodiment of the present application can also be achieved. The transmission member 3022 may be a gear, a ratchet or other structures. When the first set of rotation shaft 302 includes two or more first rotation shafts 3021, two ends of each of the first rotation shafts 3021 are both provided with the transmission member 3022, and the adjacent rotation shafts are connected through the cooperation between the transmission members. That is, the transmission member on each of the rotation shafts engage with the transmission member on the adjacent rotation shaft, thus once one of the rotation shafts rotates, other rotation shafts are rotated by the rotating rotation shaft.

As an implementation, when the first set of rotation shaft 302 includes two or more first rotation shafts 3021, the two or more first rotation shafts 3021 can only have one transmission shaft 3022, that is, each of the first rotation shafts act as a rotation shaft of the transmission member 3022. When the transmission member 3022 rotates, the two or more first rotation shafts are rotated simultaneously.

The second connection member 303 is connected to the second body 20. In the embodiment of the present application, the second connection member 303 is a connection member fixedly connected to the body of the electronic device, and the second connection member 303 is connected to the rotation shaft of the connection apparatus 30, and is rotatable along with the rotation of the rotation shaft.

The second set of rotation shaft 304 is fixedly connected to the second connection member 303. The second set of rotation shaft 304 includes at least one second rotation shaft 3041, and at least one end of the second rotation shaft 3041, which abuts against the first set of rotation shaft 302, in the at least one second rotation shaft 3041 is provided with a second transmission member 3042.

In the embodiment of the present application, the second set of rotation shaft 304 may include one or more second rotation shafts 3041, and a transmission member 3042 is provided on the second rotation shaft 3041. Generally, two ends of the rotation shaft are both provided with the transmission member 304. If only one end of the second rotation shaft 3041 is provided with the transmission member 3042, the technical solution of the embodiment of the present application can also be achieved. The transmission member 3042 may be a gear, a ratchet or other structures. When the second set of rotation shaft 304 includes two or more second rotation shafts 3041, two ends of each of the second rotation shafts 3041 are both provided with the transmission member 3042, and the adjacent second rotation shafts 3041 are connected through the cooperation between the transmission members. That is, the transmission member on each of the second rotation shafts 3041 engage with the transmission member on the adjacent second rotation shaft 3041, thus once one of the second rotation shafts 3041 rotates, other second rotation shafts 3041 are rotated by the rotating second rotation shaft 3041.

As an implementation, when the second set of rotation shaft 304 includes two or more second rotation shafts 3041, the two or more second rotation shafts 3041 can only have one transmission shaft 3042, that is, each of the second rotation shafts 3041 act as a rotation shaft of the transmission member 3042. When the transmission member 3042 rotates, the two or more second rotation shafts 3041 are rotated simultaneously.

The first damping device 305 is arranged on the at least one first rotation shaft 3021 in the first set of rotation shaft 302.

The second damping device 306 is arranged on the at least one second rotation shaft 3041 in the second set of rotation shaft 304, and the position of the second damping device 306 is corresponding to the position of the first damping device 305.

In the embodiment of the present application, the damping devices are provided for increasing the resistance of the connection apparatus 30 in the relative rotation between the first body 10 and the second body 30. Further, when the first body 10 is rotated with respect to the second body 20 to a predetermined angle threshold, the connection apparatus 30 provides the maximum resistance.

In the process of the first connection member 301 rotating with respect to the second connection member 303 in a first direction through the first set of rotation shaft 302 and the second set of rotation shaft 304, the first damping device 305 abuts against the second damping device 306 to generate a first strength of the adjustable damping force when the first connection member 301 is rotated with respect to the second connection member 303 to a first angle; the damping force generated between the first damping device 305 and the second damping device 306 is gradually increased to a second strength of the adjustable damping force when the first connection member 301 is rotated with respect to the second connection member 303 to the second angle from the first angle; the damping force generated between the first damping device 305 and the second damping device 306 is gradually decreased to a third strength of the adjustable damping force when the first connection member 301 is rotated with respect to the second connection member 302 to a third angle from the second angle; and the first damping device 305 is disengaged from the second damping device 306 when the first connection member 301 is rotated with respect to the second connection member 303 to an angle greater than the third angle.

In the process of the first connection member 301 rotating with respect to the second connection member 303 in a second direction through the first set of rotation shaft 302 and the second set of rotation shaft 304, the first damping device 305 abuts against the second damping device 306 to generate the third strength of the adjustable damping force when the first connection member 301 is rotated with respect to the second connection member 303 to the third angle; the damping force generated between the first damping device 305 and the second damping device 306 is gradually increased to the second strength of the adjustable damping force when the first connection member 301 is rotated with respect to the second connection member 304 to the second angle from the third angle; the damping force generated between the first damping device 305 and the second damping device 306 is gradually decreased to the first strength of the adjustable damping force when the first connection member 301 is rotated with respect to the second connection member 303 to the first angle from the second angle; and the first damping device 305 is disengaged from the second damping device 306 when the first connection member 301 is rotated with respect to the second connection member 303 to an angle smaller than the first angle. The first direction is opposite to the second direction.

Each of the first damping device 305 and the second damping device 306 is a cam structure.

When the first connection member 301 is rotated with respect to the second connection member 303 from the third angle to the second angle, a distance between the centre of a cam structure of the first damping device 305 and the centre of a cam structure of the second damping device 306 has a maximum value.

Each of the at least one first rotation shaft 3021 in the first set of rotation shaft 302 and the at least one second rotation shaft 3041 in the second set of rotation shaft 304 is an elastic member.

The specific structure of the connection apparatus in the embodiment of the present application can be referred to the relevant description of the above electronic device, which will not be described in detail herein.

In the technical solution according to the embodiment of the present application, damping devices are provided on the connection apparatus, thus when the electronic device using the connection apparatus according to the embodiment of the present application is rotated to an angle reaching a predetermined threshold, the damping devices abut against each other to instantaneously increase the resistance in the rotating process, and at this angle, the connection apparatus provides the maximum supporting force. That is, the angle corresponding to the maximum resistance may be set as a normally maximum rotation angle for the electronic device. Only when the user applies a greater force, the electronic device can be rotated to a greater angle, and at this time, the resistance provided by the connection apparatus is gradually decreased, which definitely improves the user experience of the electronic device. Due to the connection apparatus according to the embodiments of the present application, the electronic device can be rotated by 360 degrees. The angle corresponding to the maximum resistance can be adjusted according to the abutting manner of the damping devices Any combination can be made between the technical solutions according to the embodiments of the present application without conflict.

The embodiments described hereinabove are only exemplary embodiments of the present application, and the scope of the present application is not limited to this. Any modifications and replacements, that can be easily made by those skilled in the art based on the technical solutions disclosed in the present application, are deemed to fall into the scope of the present application.

What is claimed is:

1. An electronic device, comprising:
   a first body;
   a second body; and
   a connection apparatus rotatably connecting the first body to the second body, and the connection apparatus comprising:
      a first damping device and a second damping device, which are operable to mutually cooperate, wherein: each of the first damping device and the second damping device comprises an eccentric structure; if the first body is rotated with respect to the second body, a distance between a center of the eccentric structure of the first damping device and a center of the eccentric structure of the second damping device varies; and a contact force between the first and second damping devices is variable to accordingly generate a variable damping force on the first body and the second body according to the distance between the center of the eccentric structure of the first damping device and the center of the eccentric structure of the second damping device.

2. The electronic device according to claim 1, wherein the connection apparatus further comprises:
   a first connection member;
   a first rotation shaft coupled to the first connection member, the first damping device being coupled to the first rotation shaft;
   a first transmission member coupled to the first rotation shaft;
   a second connection member;
   a second rotation shaft coupled to the second connection member, the second damping device being coupled to the second rotation shaft; and
   a second transmission member coupled to the second rotation shaft and configured to cooperate with the first transmission member to effect a relative rotation between the first connection member and the second connection member.

3. The electronic device according to claim 2, wherein the connection apparatus further comprises: a first set of rotation shaft coupled to the first connection member, the first set of rotation shaft comprising at least the first rotation shaft; and a second set of rotation shaft coupled to the second connection member, the second set of rotation shaft comprising at least the second rotation shaft,
   wherein the first transmission member is arranged on one end of the first rotation shaft, which abuts against the second rotation shaft.

4. The electronic device according to claim 3, wherein the first damping device is operable
   to abut against the second damping device to generate a first contact force to accordingly generate a first damping force on the first body and the second body if the first body is arranged with respect to the second body at a first angle;
   to abut against the second damping device to generate a second contact force to accordingly generate a second damping force on the first body and the second body if the first body is arranged with respect to the second body at a second angle; and
   to abut against the second damping device to generate a third contact force to accordingly generate a third damping force on the first body and the second body if the first body is arranged with respect to the second body at a third angle,
   wherein the first damping force is smaller than the second damping force but greater than the third damping force.

5. The electronic device according to claim 2, wherein each of the first rotation shaft and the second rotation shaft is an elastic member.

6. The electronic device according to claim 2, wherein the connection apparatus is arranged between the first body and the second body, and a length of a first edge of the connection apparatus is equal to a length of a first edge of the first body, and the first edge of the connection apparatus is in parallel with the first edge of the first body; and
   a length of a second edge of the connection apparatus is equal to a length of a first edge of the second body, and the second edge of the connection apparatus is in parallel with the first edge of the second body.

7. The electronic device according to claim 6, wherein a main function module is formed by the first connection member, the first rotation shaft, the second connection member, the second rotation shaft, the first damping device and the second damping device.

8. The electronic device according to claim 2, wherein:
   the eccentric structure of the first damping device includes a cylindrical portion defining a hole through which the first rotational shaft extends;
   the eccentric structure of the first damping device is rotatable about the first rotational shaft;
   a longitudinal central axis of the eccentric structure of the first damping device is offset relative to a longitudinal central axis of the first rotational shaft;
   the eccentric structure of the second damping device includes a cylindrical portion defining a hole through which the second rotational shaft extends;
   the eccentric structure of the second damping device is rotatable about the second rotational shaft; and
   a longitudinal central axis of the eccentric structure of the second damping device is offset relative to a longitudinal central axis of the second rotational shaft.

9. The electronic device according to claim 2, wherein the first and second rotation shafts are configured to flex as the distance between the center of the eccentric structure of the first damping device and the center of the eccentric structure of the second damping device varies.

10. The electronic device according to claim 1, wherein the electronic device further comprises:
    an elastic cover, which wholly covers the first body, the connection apparatus and the second body.

11. The electronic device according to claim 10, wherein the elastic cover comprises a window which shows a portion of the first body, or a portion of the second body.

12. The electronic device according to claim 1, wherein:
    the eccentric structure of the first damping device includes a cylindrical portion having a first central longitudinal axis;

the eccentric structure of the first damping device is rotatable about a first rotational axis that is offset from the first central longitudinal axis;

the eccentric structure of the second damping device includes a cylindrical portion having a second central longitudinal axis; and the eccentric structure of the second damping device is rotatable about a second rotational axis that is offset from the second central longitudinal axis.

13. A connection apparatus, comprising:
a first damping device;
a second damping device;
a first connection member;
a first rotation shaft coupled to the first connection member, wherein the first damping device is coupled to the first rotation shaft;
a first transmission member coupled to the first rotation shaft;
a second connection member;
a second rotation shaft coupled to the second connection member, wherein the second damping device is coupled to the second rotation shaft; and
a second transmission member coupled to the second rotation shaft,
wherein the first damping device and the second damping device are operable to mutually cooperate; each of the first damping device and the second damping device comprises an eccentric structure; if the first connection member is rotated with respect to the second connection member, a distance between a center of the eccentric structure of the first damping device and a center of the eccentric structure of the second damping device varies; and a contact force between the first damping device and the second damping device is variable to accordingly generate a variable damping force according to the distance between the center of the eccentric structure of the first damping device and the center of the eccentric structure of the second damping device.

14. The connection apparatus according to claim 13, further comprising:
a first set of rotation shaft coupled to the first connection member, the first set of rotation shaft comprising at least the first rotation shaft; and
a second set of rotation shaft coupled to the second connection member, the second set of rotation shaft comprising at least the second rotation shaft,
wherein the first transmission member is arranged on one end of the first rotation shaft, which abuts against the second rotation shaft.

15. The connection apparatus according to claim 14, wherein each of the first rotation shaft and the second rotation shaft is an elastic member.

16. The connection apparatus according to claim 13, wherein the first damping device is operable
to abut against the second damping device to generate a first contact force to accordingly generate a first damping force on the first connection member and the second connection member if the first connection member is arranged with respect to the second connection member at a first angle;

to abut against the second damping device to generate a second contact force to accordingly generate a second damping force on the first connection member and the second connection member if the first connection member is arranged with respect to the second connection member at a second angle; and to abut against the second damping device to generate a third contact force to accordingly generate a third damping force on the first connection member and the second connection member if the first connection member is arranged with respect to the second connection member at a third angle, wherein the first damping force is smaller than the second damping force but greater than the third damping force.

17. The connection apparatus according to claim 13, wherein each of the first rotation shaft and the second rotation shaft is an elastic member.

18. The connection apparatus according to claim 13, wherein:
the eccentric structure of the first damping device includes a cylindrical portion having a first central longitudinal axis;
the eccentric structure of the first damping device is rotatable about a first rotational axis that is offset from the first central longitudinal axis;
the eccentric structure of the second damping device includes a cylindrical portion having a second central longitudinal axis; and
the eccentric structure of the second damping device is rotatable about a second rotational axis that is offset from the second central longitudinal axis.

19. The connection apparatus according to claim 13, wherein:
the eccentric structure of the first damping device includes a cylindrical portion defining a hole through which the first rotational shaft extends;
the eccentric structure of the first damping device is rotatable about the first rotational shaft;
a longitudinal central axis of the eccentric structure of the first damping device is offset relative to a longitudinal central axis of the first rotational shaft;
the eccentric structure of the second damping device includes a cylindrical portion defining a hole through which the second rotational shaft extends;
the eccentric structure of the second damping device is rotatable about the second rotational shaft; and
a longitudinal central axis of the eccentric structure of the second damping device is offset relative to a longitudinal central axis of the second rotational shaft.

20. The connection apparatus according to claim 13, wherein the first and second rotation shafts are configured to flex as the distance between the center of the eccentric structure of the first damping device and the center of the eccentric structure of the second damping device varies.

* * * * *